Aug. 29, 1967     M. FARAJIAN ETAL     3,337,980
FISH LURE
Filed March 23, 1965
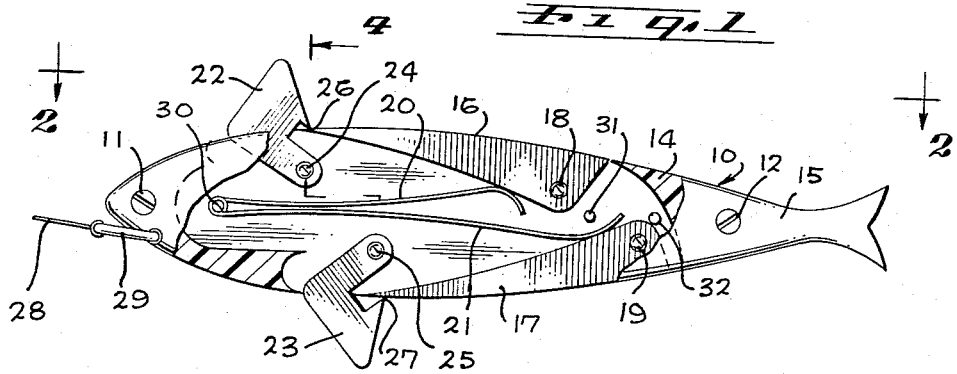
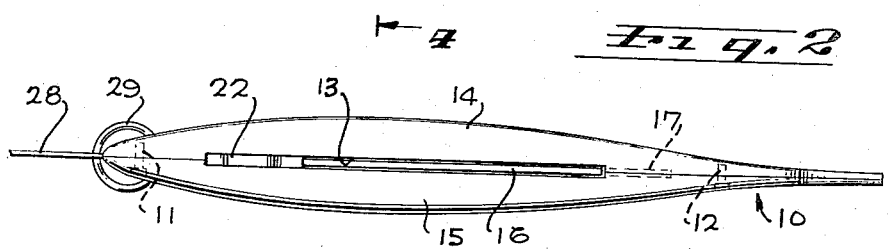
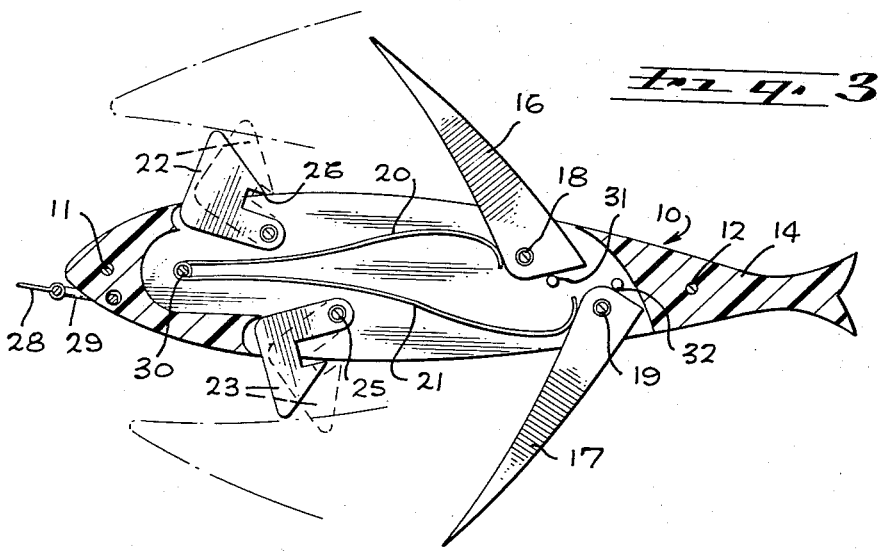
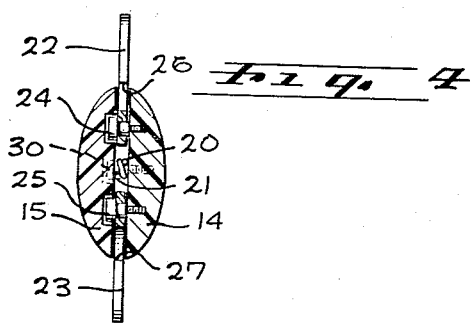
MOSES FARAJIAN
ALEX KISS
      INVENTORS
BY LeRoy J. Leishman
AGENT

United States Patent Office 3,337,980
Patented Aug. 29, 1967

3,337,980
FISH LURE
Moses Farajian, 1364 Meadowbrook Ave., Los Angeles, Calif. 90019, and Alex Kiss, 8407 La Cienega Blvd., Apt. 8, Inglewood, Calif. 90301
Filed Mar. 23, 1965, Ser. No. 442,214
8 Claims. (Cl. 43—35)

The invention herein described pertains to fish lures having hooking means that are normally mounted and wholly contained within the body of the lure and which extend partially therefrom when a fish contacts an external portion of the body of the lure, and more particularly to a device of this type in which the hooking means is substantially non-resilient and formed of thin, flat material.

Several lures having hooking means normally latched within the body of the lure have been proposed, some of which are capable of releasing the hooking means when the fisherman pulls one branch of a double fish line, the other branch serving, as does an ordinary fish line, to pull the lure through the water.

Still other fish lures of this general type employ resilient hooks that are normally disposed within the body of the lure. These hooks are usually formed of spring wire and are thus of somewhat fragile construction.

Other fish lures of this general type employ hooking means having sharp ends provided with barbs extending back at an angle from the sharpened extreme ends of the hooking means, such barbs being intended to cut into the fish if it attempts to pull away.

One of the objects of the present lure is to provide a device of this general type having none of the defects of previous lures.

In order to simplify the construction of the hooking means and to prevent unnecessary tearing of the fish, another object is to provide hooking instrumentalities without reversely pointed barbs.

A further object is to provide a lure of the type described that does not have to be removed through the mouth of the fish but which may be maneuvered out through one of the gills, the movement in this direction tending to cam the hooking means into the body of the lure without such tearing of the fish as would be caused by conventional hooks.

An additional object is to provide a latch for keeping the hooking means within the body of the lure, such latch being an integral portion of a simulated fin.

Another object is to provide a lure of the type described in which the piercing ends of the hooking means are ejected from the body of the lure by means of resilient spring members that are not a part of the hooking means themselves but which constitute separate members.

Yet another object is to provide a lure of the type described that is durable in construction and inexpensive to build.

This invention possesses many other advantages, and has other objects that may be made more clearly apparent from a consideration of an illustrative embodiment thereof. For this purpose, such an embodiment is shown in the drawings. This embodiment will now be described in detail, illustrating the general principles of the invention; but it is to be understood that this detailed description is not to be taken in a limiting sense, since the scope of the invention is best defined by the appended claims.

In the drawings:

FIGURE 1 is partly a side elevation and partly a cutaway longitudinal section of the novel fish lure described herein, with the hooking means in latched position within the body of the lure;

FIG. 2 is a view taken on line 2—2 of FIG. 1;

FIG. 3 is a view similar to FIG. 1, but with the hooking means extended from the body of the lure and a portion of the mouth of a trapped fish indicated in phantom; and FIG. 4 is a cross section taken on line 4—4 of FIG. 1.

The lure herein described is elongated in shape and has substantially the contour of a fish, as indicated in FIGS. 1, 2 and 3 of the drawings. The body 10 is provided with a longitudinally and diametrically disposed recess or kerf 13 extending transversely therethrough along a longitudinal mid-plane of the lure. If the device is constructed of a moldable material, such as a plastic, the recess or kerf 13 may be formed by constructing the body of two complementary halves 14 and 15, FIG. 2. The entire depth of the kerf may be entirely formed in one only of the complementary halves, or a portion only of the depth of the kerf may be provided in the half 14 of the body and the balance of the depth of the kerf in the complementary other portion 15 of the body, these halves of the body thus being complementary and symmetrical. The two halves of the body may be joined together by any convenient means, such as rivets or screws 11 and 12, as shown in FIGS. 1 and 2.

In the presently preferred embodiment of the invention, two blades 16 and 17 are pivotally mounted as by shoulder screws 18 and 19 or other convenient means on one of the complementary halves of the body within the recess or kerf 13. These blades taper from relatively wide butt ends, at which they are respectively pivoted, to sharp pointed ends. The presently preferred method of manufacturing these blades is to stamp them from flat stainless steel stock.

These blades are so shaped that they may lie entirely within the kerf 13, their outer edges being convex in configuration. The inner edges of the blades are preferably somewhat concave in construction as shown in FIGS. 1 and 3. It will be noted that the pivots 18 and 19 for the blades 16 and 17, respectively, are so staggered that the blades do not overlap each other at any of the various positions that they may occupy between those shown in FIG. 1 and those illustrated in FIG. 3.

The blades 16 and 17 are urged respectively toward the stops 31 and 32, as shown in FIG. 3, by a torsion spring that is formed of spring wire looped around a shoulder screw 30 or other appropriate anchoring means. This spring has two arms 20 and 21 that are so curved on their external sides that the concave edges of the blades always bear against a curved portion of one of the spring arms.

The blades are normally held within the body of the lure against the pressure of the spring arms 20 and 21 by the latching fins 22 and 23. These fins may appropriately be pivoted to one of the complementary halves of the lure within the kerf 13 by means of shoulder screws 24 and 25 or other equivalent means. The fin-like members 22 and 23 are free to rotate on their pivots within the limits of their possible travel, and are not spring loaded in either direction.

To "set" the lure, the blades are held in their retracted positions pictured in FIG. 1 by grasping the outer convex edges of the blades in any convenient manner, as between the thumb and middle finger, and holding them in their retracted positions against the tension of the spring arms 20 and 21 until they are latched. Blade 16 is latched by moving fin 22 toward the tail of the lure so that its hook 26 extends over the pointed end of the blade 16. The hook and blade are then held in this position by the pressure exerted upon blade 16 by arm 20 of the loading spring. Blade 17 is similarly latched during the setting operation by moving the hooked portion 27 of fin 23 over the pointed end of the blade. These members are then held in their latched position by the resilience of arm 21 of the loading spring.

If either of the fins is pressed in a direction toward the head of the fish lure, the latching portion of the said fin will of course move beyond the end of the associated blade, causing it to flip outward to the position indicated in FIG. 3.

If the lure is being drawn through the water, as by a line 28 attached to a ring 29 pivoted to the fore end of the lure, a fish attempting to swallow the lure will approach it from behind. When the fish opens its mouth it will be disposed with respect to the lure and its component parts in substantially the position indicated in broken lines in FIG. 3. Pressure against either of the fins releases the associated blade, and pressure against both fins of course releases both blades which tend to assume the positions indicated in FIG. 3. The blades thus extend outwardly within the mouth of the fish, thus limiting the forward movement of the fish which can not back away and release itself because its upper and lower inner jaws are impaled from within by the pointed ends of the blades.

As hereinbefore stated, the fisherman may remove the lure from the mouth of the fish by maneuvering it backward through one of the gills.

Various modifications may of course be made in the illustrative embodiment herein described, and parts may be rearranged or transposed or replaced by other parts performing the same function or the same functions plus additional functions—all without departing from the broad spirit of the invention as succinctly set forth in the appended claims.

The inventors claim:

1. A fish lure including in combination: an elongated body member having a longitudinally and diametrically disposed recess therein extending transversely therethrough along a longitudinal mid-plane of said member; a flat blade pointed at one end and pivoted to said member near its other end within said recess and angularly movable between a confined position in which it is entirely disposed within said member and a non-confined position in which its pointed end protrudes from said recess; a torsion spring anchored within said recess and bearing against said blade to urge it toward said non-confined position; and a latching element pivotally mounted within said recess and having a portion protruding from said recess, said portion comprising an integral hook so disposed thereon that in one angular position of said element the hook will engage the pointed end of said blade and retain the blade in said confined position against the pressure of said spring, the angular movement of said element from said one angular position acting to release said blade and permit it to move to said non-confined position under the action of said spring.

2. A fish lure including in combination: an elongated body member having a longitudinally and diametrically disposed recess therein extending transversely therethrough along a longitudinal mid-plane of said member; a pair of flat blades each pointed at one end and pivoted to said member near their other ends within said recess and each angularly movable between a confined position in which it is entirely disposed within said member and a non-confined position, said blades in their non-confined positions protruding from respectively opposite sides of said recess; a torsion spring comprising a coil and a pair of arms, said coil encircling a boss mounted within said recess and said arms extending from said coil and each bearing upon a different one of said blades to urge it to its non-confined position; and a pair of latching elements pivotally mounted within said recess and protruding from respectively opposite sides thereof, each of said elements comprising a hook so disposed thereon that in one angular position of said element the hook will engage the pointed end of the proximal blade and retain said blade in its confined position against the pressure of the engaging arm of said spring, the angular movement of each of said elements from said one angular position acting to release the associated blade and permit it to move to said non-confined position under action of said spring.

3. The combination set forth in claim 1 in which said member is shaped to simulate a fish and in which said element is shaped to simulate a fin of a fish.

4. The combination set forth in claim 2 in which said member is shaped to simulate a fish and in which said elements are shaped to simulate fins.

5. The combination of claim 1 in which the torsion spring is so curved in the plain of said recess that it always presents a convex surface to the engaging edge of said blade.

6. The combination of claim 2 in which said arms are so curved in the plain of said recess that said blades are always engaged by convex surfaces of the respectively associated arms.

7. The combination of claim 1 in which said member is shaped to simulate a fish including its head and tail, and in which the blade is so pivoted near the tail of the fish that the point of the blade in the non-confined position thereof points generally away from the tail.

8. The combination of claim 2 in which said member is shaped to simulate a fish including its head and tail, and in which the blades are so pivoted near the tail of the fish that their pointed ends in the non-confined positions of the blades are directed generally away from the tail.

References Cited

UNITED STATES PATENTS

| | | | |
|---|---|---|---|
| 635,547 | 10/1899 | Howard | 43—35 |
| 922,879 | 5/1909 | Gabrielson | 43—36 |
| 1,467,750 | 9/1923 | Borg | 43—35 |
| 2,079,509 | 5/1937 | Kettring | 43—35 |
| 2,326,620 | 8/1943 | Charpentier | 43—35 |
| 2,667,006 | 1/1954 | Lehmann | 43—35 |

SAMUEL KOREN, *Primary Examiner.*

W. H. CAMP, *Assistant Examiner.*